United States Patent Office 3,115,861
Patented Dec. 31, 1963

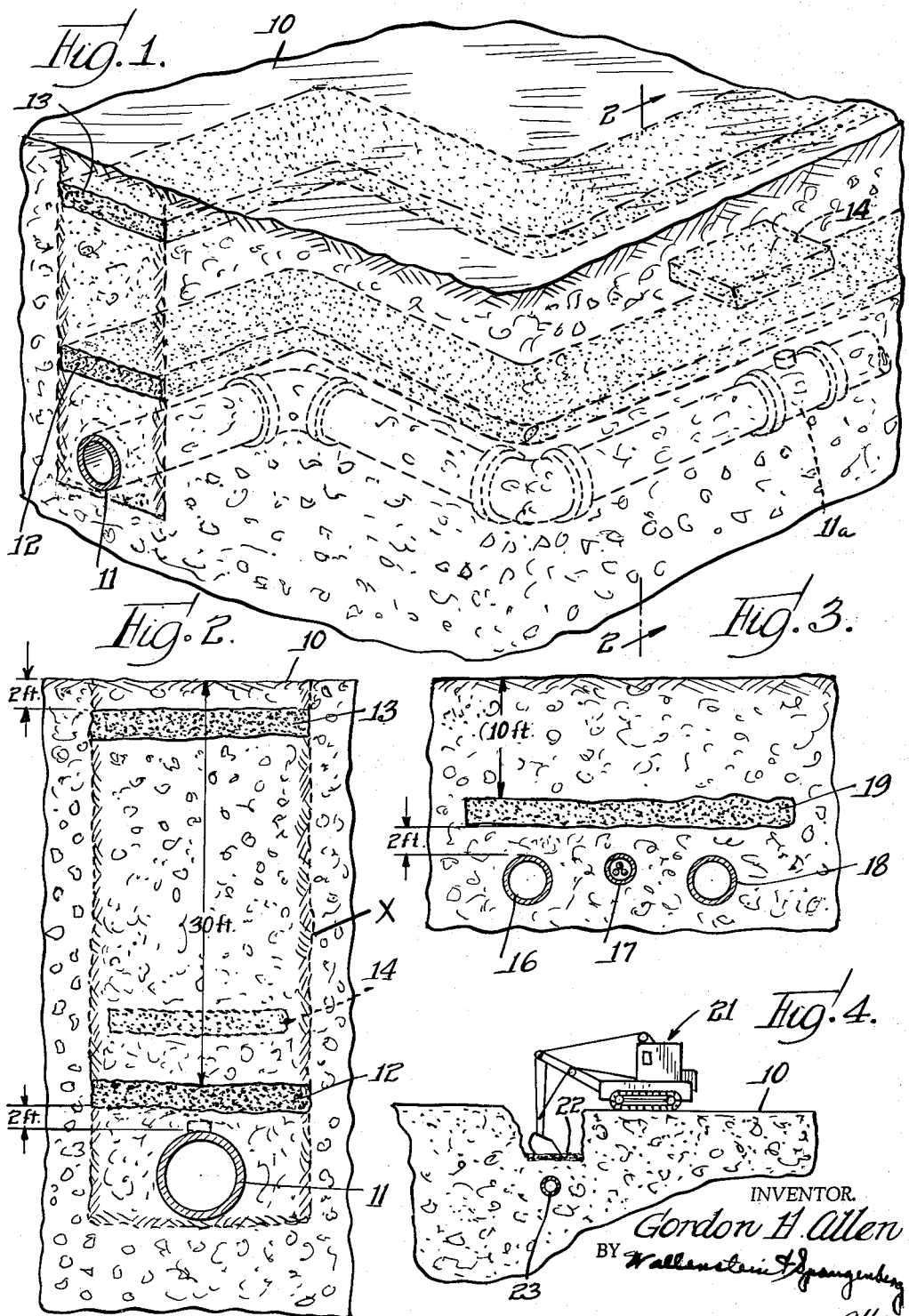

3,115,861
LOCATING ELEMENTS OF CONSTRUCTION
BENEATH THE SURFACE OF EARTH SOILS
Gordon H. Allen, 145 S. Summit, Wheaton, Ill., assignor of one-third to J. L. Tremper, Streator, Ill., and one-third to George B. Smith, Waterman, Ill.
Filed Feb. 29, 1960, Ser. No. 11,870
10 Claims. (Cl. 116—114)

This invention is concerned with new and useful improvements for facilitating the location, beneath the surface of earth soils and the like, of wires, cables, conduit, sewer pipes and sewer connections, valves, and like elements of construction.

It is a matter of common knowledge to those versed in the art that cities and municipalities, farmers, telephone companies, electric companies, gas companies and numerous others who have underground or subterranean installations and are faced with the requirement of servicing and maintaining the same have encountered considerable practical difficulties in locating, as well as in identifying, underground installations of the character referred to above. When there is a breakdown in underground gas, electrical, telephone, sewer or related facilities as, for instance, by leakage in a pipe or a valve or the breaking of a wire, or whatever the reason may be which renders it necessary to work on equipment located or buried beneath the surface of the earth, it is essential to be able simply and economically to locate the particular underground installation or a portion thereof which requires attention or which it is necessary to locate.

In endeavoring to locate such underground installations or elements of construction, considerable error searching is commonly involved. Hand digging frequently is utilized and a very substantial amount thereof, entailing considerable time and expense, is very frequently necessary before the desired installation or element of construction is located. Where machine digging is utilized, it is common practice to find that the machine used for digging accidently strikes the pipe, conduit, electric wire or cable, or similar installation or element of construction and severely damages the same. In certain instances, as many as 100 feet of ditch have had to be dug in an effort to locate a given installation or element of construction. Large sums of money, in each year, have thus been spent and, indeed, wasted by engineers, contractors, public utility companies and municipalities not only in unnecessary time and expense with reference to the location of the desired underground installation or element of construction but, in addition, the repair of damage to installations, damage which, in the past, also has not infrequently resulted in unnecessary loss of life.

The present invention makes possible the facilitation of the location of subterranean or underground installations or elements of construction in a simple manner, at low cost and in a safe and reliable manner even after the lapse of many years after the ditch has been covered over. Broadly speaking, it involves, for instance, at the time of the original installation of the elements of construction, providing beneath the surface of the earth or the like, and in a position above and extending over the lateral extent of the installation or elements of construction sought to be located, a readily frangible colored body, said colored body carrying a substantially water-insoluble coloring material the color of which contrasts with that of the surrounding earth soil. In accordance with the invention, a given limited area around the underground installation or element of construction is colored in a predetermined location and in a predetermined area in relation to the installation or element of construction the location of which it is desired to ascertain, and the color is selected so as to be clearly contrasting with the other portions of the surrounding subterranean earth.

The full advantages of the invention and a full and complete understanding of the principles thereof will become apparent in connection with a consideration of the attached drawing which shows illustrative underground installations of various elements of construction, wherein there is embodied arrangements of contrasting colored portions beneath the surface of the earth in illustrative predetermined position whereby to facilitate the location of said elements of constructions in a simple, efficacious and safe manner.

FIG. 1 is a perspective view partly in section showing the location of a colored body in an underground installation where the element of construction is, for instance, a sewer pipe carrying a valve therein, a type of installation in which the element of construction is disposed quite deeply beneath the surface of the earth.

FIG. 2 is an enlarged vertical sectional view taken along the line 2—2 of FIG. 1.

FIG. 3 is a vertical sectional view of another underground installation where several different elements of construction are located near each other and at a relatively shallow depth beneath the surface of the earth and showing the location of a colored body in relation thereto.

FIG. 4 is a generally schematic view showing the manner in which a machine digger encounters a colored body thereby serving to facilitate the location of an element of construction beneath the surface of the earth.

Referring, now, to FIGS. 1 and 2, the surface of the earth is designated by the numeral 10. Disposed beneath the surface 10 at a depth of about 30 to 40 feet and adjacent the bottom of a previously dug ditch or trench, indicated by the dotted line X, is a string of sewer pipe 11 for carrying sewage or the like and provided with a valve 11a. After filling in the trench with earth to a depth of about 2 feet above the top of the pipe, there is then placed above said pipe 11 and extending over the lateral extent thereof a readily frangible colored body 12 of earth soil or other material which extends along the length of the pipe 11 about 2 to 2½ feet above the top of the pipe. The colored body 12 may have a thickness of about 1 to 1½ feet and, assuming that the outside diameter of the pipe 11 is 6 feet, the width of said colored body 12 may be of the order of 10 to 12 feet, thus extending laterally of the pipe 11 approximately 2 to 3 feet in each direction. It may also be advantageous to provide a second colored body 13 disposed in general vertical alinement with the colored body 12 and, in such case, said second colored body 13 may be located at a distance about 2 to 3 feet below the surface of the earth. Its width may be substantially the same as that of the colored body 12 or of somewhat lesser width, and its thickness may be of the order of about 1 to 2 feet. The upper colored body 13 serves as a preliminary identification, ascertained almost immediately upon beginning the digging operation, of the fact that, in general vertical alinement therewith, there is located the sought for pipe 11 and a short depth over which there will be found another colored body.

In certain instances, it may be desirable to locate above the valve 11a a separate colored body which may bear a particular color serving as a valve identification. In FIGS. 1 and 2, there is shown such a colored body 14 which overlies the valve 11a and extends laterally thereof. The dimensions of said colored body 14 may be chosen so as to overlie the valve 11a a distance of 2 to 3 feet laterally and longitudinally of the peripheral margins of said valve. The thickness of said colored body 14 may be of the order of 1 to 2 feet, and it may constitute a separate body overlying the colored body 12 as shown, for instance, 2 feet thereabove, or, if desired, it may, in the area involved in relation to the valve 11a, be set in position in lieu of that portion of the body 12 which overlies the valve 11a.

In any event, whether one or more colored bodies is utilized, the balance of the trench is filled in with earth.

In FIG. 3, an analogous arrangement is shown in which, below the surface of the earth, at a relatively shallow depth, of the order of 6 feet, a plurality of elements of construction is shown, by way of example, a water pipe 16, telephone cable 17, and gas main 18. Disposed thereabove, about 2 feet above said elements of construction, is a colored body 19 which is located about 10 feet beneath the surface of the earth. Said colored body 19 may be about 1¼ to 2 feet thick and is of sufficient width to extend laterally beyond the water pipe 16 and the gas main 18 a distance of 1½ to to 2 or 3 feet in each direction.

In FIG. 4, there is shown in schematic form a machine digger 21 with the earth moving member thereof encountering a colored body 22 in the course of its digging whereby to indicate the near presence of the pipe 23.

Generally speaking, in dealing with elements of construction disposed from about 5 to 15 feet beneath the surface of the earth, the readily frangible colored body desirably is disposed about 1 to 2 feet above the said elements of construction and extends laterally thereof a distance of one to several feet in each direction. Where the elements of construction are in excess of about 20 feet beneath the surface of the earth, and wherein, say, two separate, vertically spaced colored bodies are utilized, the uppermost of said bodies desirably may have a thickness of the order of 1 to 3 feet and the upper surface of which may be about ½ to 2 feet below the surface of the earth, and the other or lowermost of said colored bodies desirably may have a thickness of the order of 1 to 3 feet and the lower surface of which is about 1 foot to 3 feet above the top of the element of construction to be located.

As indicated above, the practice of the present invention may also be coupled with facilitating the identity of each particular underground installation or facility. Thus, for example, certain specific colors may be utilized to identify electrical cable, still others may be used to identify fresh water pipes, others to identify sewer pipes or sewer pipe fittings, etc. Thus, it is clear that the selection of given colors for identification purposes will serve this purpose over and above what may be considered to be the primary purpose of the present invention, namely, to facilitate the location of the given underground facility, installation or element of construction as the case may be.

Various water-insoluble coloring materials can be used in the practice of the invention. Such coloring materials include, for instance, colored inorganic pigments, ground iron ores, other natural ores and materials having appreciable color, and synthetic metallic oxides of iron, chromium, cobalt, copper, crushed or ground brick, colored crushed stone, as well as organic dyes, particularly those which are relatively stable or fast to acid and alkali conditions which may be encountered in the soil. The colors which are produced in the soil or which are added to the soil as a colored body can be selected to provide brilliant or markedly contrasting shades of color in relation to the color of the sub-soil. Thus, for instance, in yellow soils, the coloring material may be bright red; in black soils, the coloring material may be bright yellow, etc.

While ordinary water-insoluble pigment colors may be utilized as such to constitute the colored bodies for placement in the earth pursuant to the principles of the present invention, such does not represent the preferred procedure because such colors are expensive and do not readily distribute themselves through the area and volume to be covered by the color. It is particularly desirable, in the practice of the invention, therefore, to admix the desired color, which will ordinarily be in the form of an inorganic pigment which is essentially insoluble in water and which will maintain its color under conditions existing beneath the surface of the earth in the environment in which said color is placed, with a filler as, for instance, ground limestone, diatomaceous earth, ground silica, ground slags from blast furnace and other operations, as well as inexpensive fillers of organic character such as wood flour, ground oat hulls, ground corn cobs, and ground inexpensive cereal grain offal. It is particularly preferred to utilize as the filler material light, very fluffy substances as, for instance, expanded vermiculite, expanded perlite, or ground corn cobs so that, when mixed with the color, a cubic foot of the colored filler, or color-filler mixture, does not weigh more than about 30 lbs. per cubic foot and is preferably in the range of about 10 to 12 or 15 lbs. per cubic foot. Such light, fluffy colored materials, which have a large volume per unit of weight, can be employed very economically in connection with the practice of the invention. Where organic substances are used as the fillers, they may be of such character as physically to disintegrate or to disappear under the conditions which exist underneath the surface of the earth where they are employed. However, even where this occurs, the metallic oxide and other like coloring materials remain essentially indestructible and serve the purpose of the invention most effectively. Generally speaking, the water-insoluble filler will ordinarily have a bulk density in the range of 10 to 90 lbs. per cubic foot, and the admixture thereof with the coloring material particularly advantageously may have a bulk density in the range of 10 to 40 lbs. per cubic foot.

Illustrative examples of suitable coloring compositions are those containing 80 to 90 pounds of whiting, preferably about 200 mesh or finer, in admixture with 20 to 10 lbs. of a coloring metallic oxide as, for instance, iron oxides, chromium oxides, cobalt oxides, manganese oxides, or carbon black.

It may be desirable, in certain instances, to admix the water-insoluble coloring material, with or without added substances, with water, and with or without color dispersing agents, and with a temporary binder to convert the mass into paste form which may then be dried and reground in order to produce a colored material in which the color is distributed over a large surface, thus making for more economic use.

The colored bodies can be produced in any one of a number of different ways. Thus, for example, as indicated above, a solid colored volume of material, separate and distinct from the underground earth itself, can be placed over the pipe, connection, or other installation or element of construction at the desired height and over the desired area, and the balance of the trench, ditch or the like can be filled in with the usual earth which had been dug out therefrom initially to make the trench, ditch or the like. Another procedure which may be utilized consists in coloring a portion of the earth which was removed in connection with the digging of the trench or the ditch or the like, or coloring a body of earth obtained elsewhere, and then filling into said trench, ditch or the like, in the required position, said colored earth.

Another way in which the coloring of the body of earth can be effected is to place a perforated plastic pipe or other type of container or the like into the earth in an appropriate location in relation to the element of construction whose location may later be sought, then fill the ditch completely, and then pump the color into the desired area through said perforations from a pipe connected to said perforated member.

In certain environments there may be considerable flow of water through the earth in the area where the colored body is to be placed. In such instances, it may be desirable to utilize a binder with the color pigment or the like. Again, in such or similar environments, where there might be a condition tending physically to wash away the color pigment or the like or to extend it over an unduly large area, it may be desirable to produce a solid colored body having a relatively appreciable self-sustaining character. This can be done, for instance, by mixing some earth soil with the color pigment and with a small amount of Portland cement to slightly set the body in the ground. The amount of Portland cement would be distinctly less than would produce a hard impervious mass but a form-sustaining colored body may be produced sufficiently strong to prevent its being washed away and yet frail enough to be crumbled by a mechanical digging tool without damage to the tool.

In the light of the foregoing detailed description of the invention, it will be seen that the practice of the present invention may be stated, in brief, to produce the following significant advantages:

(1) Positive identification of specific elements of construction, with particular advantage to municipalities and subdividers.

(2) Elimination of substantial heretofore wasted hours of labor in searching and digging for unmarked and unidentifiable elements of construction, heretofore unlocatable unless or until the same are actually found in the earth.

(3) The elimination of damage to installations through prior ready ascertainment of their locations.

(4) Positive identification of the type of utility through the utilization of predetermined systematized colors.

To facilitate the expression of the invention in the claims, the term "elements of construction" as used in said claims will be understood to encompass such items as wires, cables, telephone lines, power lines, conduit, sewer pipes, tile, oil pipes, gas mains, water pipes, passing or crossing utility lines, T's, Y's and other connections, and the like, which are placed beneath the surface of the earth and the location of which it may be desired to ascertain at any time thereafter.

The term "earth soils" is used in the claims in a generic sense to cover subsoils including sands and gravel as well as other materials lying below the exterior surface of the earth.

What is claimed as new and desired to be protected by Letters Patent of the United States is:

1. An area of earth soil carrying beneath the surface thereof at least one element of construction and a readily frangible colored body beneath said surface and located above and extending over the lateral extent of said element of construction, said colored body carrying a substantially water-insoluble coloring material the color of which contrasts with that of the surrounding earth soil whereby to facilitate the location of said element of construction.

2. An area of earth soil carrying at least one element of construction positioned from about 5 to 15 feet beneath the surface of said earth soil and a readily frangible colored body beneath said surface and in a position about 1 to 2 feet and extending over the lateral extent of said element of construction a distance of about one to several feet in each direction, said colored body carrying a substantially water-insoluble coloring material the color of which contrasts with that of the surrounding earth soil whereby to facilitate the location of said element of construction.

3. An area of earth soil carrying at least one element of construction positioned in excess of about 20 feet beneath the surface of said earth soil and two readily frangible colored bodies disposed in a position above and extending over the lateral extent of said element of construction, said colored bodies each carrying a substantially water-insoluble coloring material the color of which contrasts with that of the surrounding earth soil, said bodies being spaced vertically from each other, the first of said bodies having a thickness of the order of 1 to 3 feet and the upper surface of which is about ½ foot to 2 feet below the surface of said earth soil, and the second of said bodies having a thickness of the order of 1 to 3 feet and the lower surface of which is about 1 foot to 3 feet above the top of said element of construction.

4. An area of earth soil in accordance with claim 1, wherein said water-insoluble coloring material is a metallic oxide.

5. An area of earth soil in accordance with claim 1, wherein said water-insoluble coloring is carried in a water-insoluble filler.

6. An area of earth soil in accordance with claim 1, wherein said water-insoluble coloring material is mixed with a water-insoluble filler, the bulk density of said mixture of coloring material and filler being from 10 to 30 pounds per cubic foot.

7. In a method of facilitating the location of an element of construction disposed beneath the surface of the earth, the steps which comprise digging a trench in the earth, providing an element of construction therein, then placing a readily frangible colored body in said trench and above said element of construction and extending over the lateral extent of said element of construction, said body embodying a substantially water-insoluble coloring material the color of which contrasts with that of the surrounding earth soil, and then filling said trench with earth.

8. In a method of facilitating the location of at least one element of construction disposed beneath the surface of the earth and in which a trench is dug into the earth and an element of construction is placed therein, the steps which comprise providing a readily frangible colored body in said trench and above said element of construction and extending over the lateral extent of said element of construction, said body embodying a substantially water-insoluble coloring material the color of which contrasts with that of the surrounding earth soil, and then filling said trench with earth.

9. In a method of facilitating the location of at least one element of construction disposed beneath the surface of the earth and in which a trench is dug into the earth and an element of construction is placed therein at a depth of from 5 to 15 feet beneath the surface of the earth, the steps which comprise covering said element of construction with earth to a depth of at least about a foot, providing a readily frangible colored body in said trench and above said last-mentioned earth and about 2 to 2½ feet above the top of said element of construction and extending from one to several feet in each direction laterally of said element of construction, said body embodying a substantially water-insoluble coloring material the color of which contrasts with that of the surrounding earth soil, and then filling said trench with earth.

10. In a method of facilitating the location of at least one element of construction disposed beneath the surface of the earth, the steps which comprise digging a trench into the earth, providing an element of construction therein, placing two readily frangible colored bodies in said trench and extending over the lateral extent of said element of construction, said bodies being spaced vertically from each other, the first of said bodies having a thickness of the order of 1 to 3 feet and the upper surface of which is about ½ foot to two feet below the surface of the earth, and the second of said bodies having a thickness of the order of 1 to 3 feet and the lower surface of which is about 1 to 3 feet above the top of said element of construction, said bodies embodying a substantially water-insoluble coloring material the color of which contrasts with that of the surrounding earth soil, and then filling said trench with earth.

References Cited in the file of this patent
UNITED STATES PATENTS

| | | |
|---|---|---|
| 2,007,465 | Burt | July 9, 1935 |
| 2,183,654 | Moore | Dec. 19, 1939 |
| 2,782,750 | Hundhansen | Feb. 26, 1957 |